United States Patent
Tseng et al.

(10) Patent No.: US 7,292,903 B2
(45) Date of Patent: Nov. 6, 2007

(54) METHODS FOR DETERMINING TOOL ASSIGNMENT PREFERENCE AND MANUFACTURING SYSTEMS USING THE SAME

(75) Inventors: Li-Chuan Tseng, Kaohsiung (TW); Chih-Neng Liu, Hsinchu (TW); Chia-Jen Fu, Hsinchu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 295 days.

(21) Appl. No.: 11/184,793

(22) Filed: Jul. 20, 2005

(65) Prior Publication Data

US 2006/0195209 A1    Aug. 31, 2006

(30) Foreign Application Priority Data

Feb. 17, 2005  (TW) .............................. 94104613 A (51) Int. Cl.
*G06F 19/00*    (2006.01)
(52) U.S. Cl. ...................................... 700/99
(58) Field of Classification Search ................. 700/96, 700/99–102; 705/7, 8
See application file for complete search history.

(56) References Cited

U.S. PATENT DOCUMENTS

| | | | | |
|---|---|---|---|---|
| 4,994,980 A | * | 2/1991 | Lee et al. ................... | 700/173 |
| 5,258,915 A | * | 11/1993 | Billington et al. .......... | 700/103 |
| 6,470,231 B1 | * | 10/2002 | Yang et al. .................. | 700/121 |
| 6,920,366 B1 | * | 7/2005 | Luh et al. .................... | 700/101 |
| 7,043,320 B1 | * | 5/2006 | Roumeliotis et al. ....... | 700/100 |
| 7,130,707 B2 | * | 10/2006 | Chao et al. .................. | 700/100 |
| 2003/0050817 A1 | * | 3/2003 | Cargille et al. ................ | 705/8 |
| 2005/0108072 A1 | * | 5/2005 | Retsina ......................... | 705/7 |
| 2005/0137732 A1 | * | 6/2005 | Chao et al. .................. | 700/100 |
| 2005/0182596 A1 | * | 8/2005 | Chang ........................ | 702/182 |
| 2005/0234578 A1 | * | 10/2005 | Liu et al. .................... | 700/100 |
| 2007/0073431 A1 | * | 3/2007 | Roumeliotis et al. ....... | 700/100 |

* cited by examiner

*Primary Examiner*—M. N. Von Buhr
(74) *Attorney, Agent, or Firm*—Birch, Stewart, Kolasch & Birch, LLP (57) ABSTRACT

A method for determining tool assignment preference applied to a semiconductor manufacturing system. At least one first tool and second tool and at least one first semiconductor process and second semiconductor process applied to the tools are provided. Demand moves provided by the first and second semiconductor processes are calculated. Assignment preferences of the first and second tools are determined using a statistical method. The statistical method is a two-step data feedback method, comprising the steps of, in the first step, calculating assignment preferences of tools without setting assignment preferences, and, in the second step, assigning assignment preferences to the first and second tools according to the calculation result in the first step, wherein the first tool is assigned to a first assignment preference with a lowest average utility rate, and the second tool is assigned to a second assignment preference.

15 Claims, 7 Drawing Sheets

|          | Tool#1 | Tool#2 | Tool#3 | Tool#4 | Tool#5 | Tool#6 |
|----------|--------|--------|--------|--------|--------|--------|
| Process#1 | X | O | X | O | X | X |
| Process#2 | O | O | O | O | X | X |
| Process#3 | O | O | X | X | X | O |
| Process#4 | O | X | O | X | X | O |
| Process#5 | X | O | O | O | X | X |
| Process#6 | O | X | O | O | X | O |
| Process#7 | X | X | O | O | X | X |

| | Tool Loading (%) | Assignment Preference |
|---|---|---|
| Tool#1 | 78% | 2 |
| Tool#2 | 89% | 4 |
| Tool#3 | 95% | 6 |
| Tool#4 | 75% | 1 |
| Tool#5 | 92% | 5 |
| Tool#6 | 86% | 3 |

FIG. 3

| | Tool#1 | Tool#2 | Tool#3 | Tool#4 | Demand Move |
|---|---|---|---|---|---|
| Process#1 | | $X_{12}$ | $X_{13}$ | $X_{14}$ | 120 |
| Process#2 | | $X_{22}$ | $X_{23}$ | $X_{24}$ | 122 |
| Process#3 | | $X_{32}$ | $X_{33}$ | $X_{34}$ | 125 |
| Process#4 | $X_{41}$ | $X_{42}$ | $X_{43}$ | | 120 |
| Process#5 | $X_{51}$ | $X_{52}$ | $X_{53}$ | $X_{54}$ | 125 |
| Process#6 | $X_{61}$ | $X_{62}$ | $X_{63}$ | $X_{64}$ | 120 |
| Limited Move | 120 | 120 | 130 | 150 | |

FIG. 4A

| | Tool#1 | Tool#2 | Tool#3 | Tool#4 | Demand Move |
|---|---|---|---|---|---|
| Process#1 | | 23 | 12 | 15 | 120 |
| Process#2 | | 35 | 15 | 16 | 122 |
| Process#3 | | 10 | 30 | 20 | 125 |
| Process#4 | 40 | 20 | 18 | | 120 |
| Process#5 | 28 | 12 | 20 | 30 | 125 |
| Process#6 | 31 | 15 | 25 | 24 | 120 |
| Move Amount | 99 | 115 | 120 | 105 | |
| Assignment Preference | 3 | 1 | 1 | 2 | |

FIG. 4B

|  | First Step | Second Step | |
|---|---|---|---|
|  | Assignment Preference | Tool Loading (%) | Assignment Preference |
| Tool#1 | No | 78 | 1 |
| Tool#6 | No | 86 | 1 |
| Tool#2 | No | 89 | 2 |
| Tool#5 | No | 90 | 2 |
| Tool#3 | No | 95 | 2 |
| Tool#4 | No | 98 | 2 |

METHODS FOR DETERMINING TOOL ASSIGNMENT PREFERENCE AND MANUFACTURING SYSTEMS USING THE SAME

BACKGROUND

The invention relates to semiconductor manufacturing processes, and more particularly, to methods for determining tool assignment preference for semiconductor manufacturing systems, enabling ontime delivery and maximum move for manufacturing products.

In semiconductor manufacturing for production implementation, some (semiconductor) fabrication factories request ontime delivery, some (memory) fabrication factories request the maximum tool utility rate and move, and others mix the above production modes for requesting make-to-order and make-to-stock productions, considering ontime delivery and the maximum move both. The relationship, however, between manufacturing cycle time and tool utilization represents a trade-off. Additionally, the assignment to bottleneck tools seriously affects the manufacturing cycle time and tool utilization, considering tool variation, product specification limitations, or move qualities, such that each tool in the same group may produce different manufactures, resulting in tool assignment troubles if a type of manufacture is required.

Figure 1:
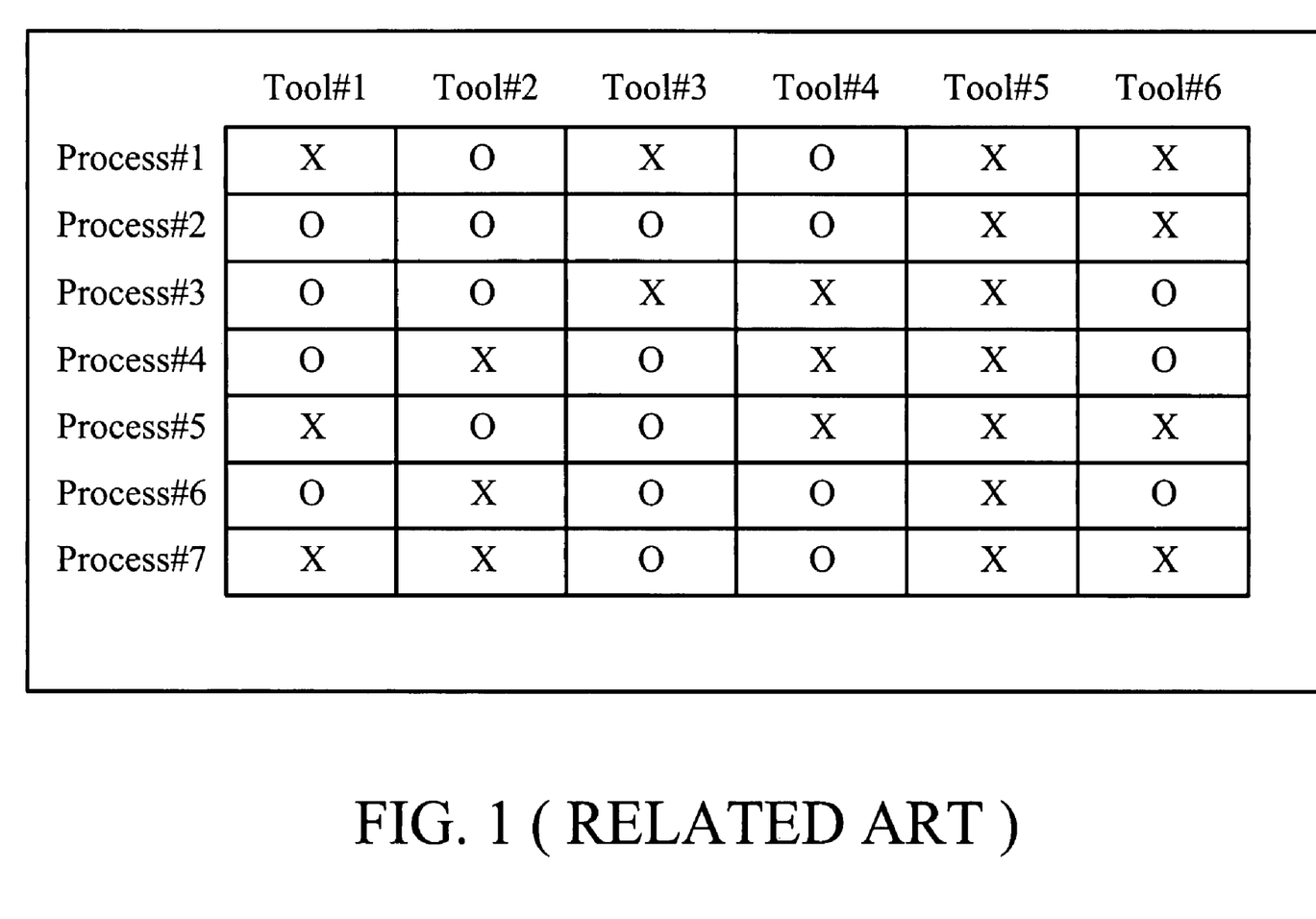
FIG. 1 is a schematic diagram showing the relationship between tool variations and processes.

FIG. 1 is a schematic diagram showing the relationship between tool variations and processes. In an embodiment of the present invention, tools 1~6 belong to the same group and are used for production and manufacturing, and processes 1~7 are applied to the described tools for production and manufacturing, with the number thereof not intended to limit the present disclosure. Tool 1, for example, can execute processes 2, 3, 4, and 6. Process 3, for example, can be applied to tools 1, 2, and 7. Processes applied to each tool may not be entirely the same, and, when processes must be implemented on a wafer lot and tools executing the processes are assigned using a current assignment method, manufacturing damage may occur and efficiency decrease. Thus, according to some bottleneck tools causing manufacturing limitations, it is obviously important to determine assignment preferences of products and processed tools.

As described above, due to tool variations, restrictions to each tool in the same group to produce a portion of products, and move limitations to each tool, improper assignment of preferences to tools results in move loss and delivery delay. Thus, an improved method for determining tool assignment preference is desirable.

SUMMARY

Methods for determining tool assignment preference, applied to a semiconductor manufacturing system, are provided. In an embodiment of such a method, at least one first tool and second tool and at least one first semiconductor process and second semiconductor process applied to the tools are provided in the semiconductor manufacturing system. Demand moves provided by the first and second semiconductor processes are calculated. Assignment preferences of the first and second tools are determined using a statistical method. The statistical method is a two-step data feedback method, comprising the steps of, in the first step, calculating assignment preferences of tools without assignment preference setting, and, in the second step, assigning assignment preferences to the first and second tools according to the calculation, wherein the first tool is assigned to a first assignment preference with a lowest average utility rate, and the second tool is assigned to a second assignment preference.

BRIEF DESCRIPTION OF THE DRAWINGS

The present invention can be more fully understood by reading the subsequent detailed description and examples of embodiments thereof with reference made to the accompanying drawings, wherein.

DETAILED DESCRIPTION

Embodiments of the invention disclose methods for determining tool assignment preference and manufacturing systems using the same. The method for determining tool assignment preference uses a supply chain planning tool (as material & capacity planner (MCP) developed by ADEXA Corporation), predicting moves and time for each lot every day and inputs and outputs for production planning over half year. As described above, a mix mode for productions comprises make-to-order and make-to-stock types. Because of a due date for each product lot, the make-to-order production possesses an assignment preference when the predicted production time may be exceeded. Accordingly, when the MCP simulates assignment actions in assembly lines, assignment preferences of tools are determined according to whether each product lot is delivered on time. In semiconductor factories, a scheduling system, a dynamic discrete event scheduling tool, comprises limitations during simulation on selecting tools for production, therefore being incapable of optimum production, such that assignment preference rules must be defined to correct the MCP system simulations. As MCP model simulations reach real assignment actions more, simulation results correspond to real situations more, and input and output predictions simulated by the MCP thus approach real data produced in wafer factories.

Figure 2:
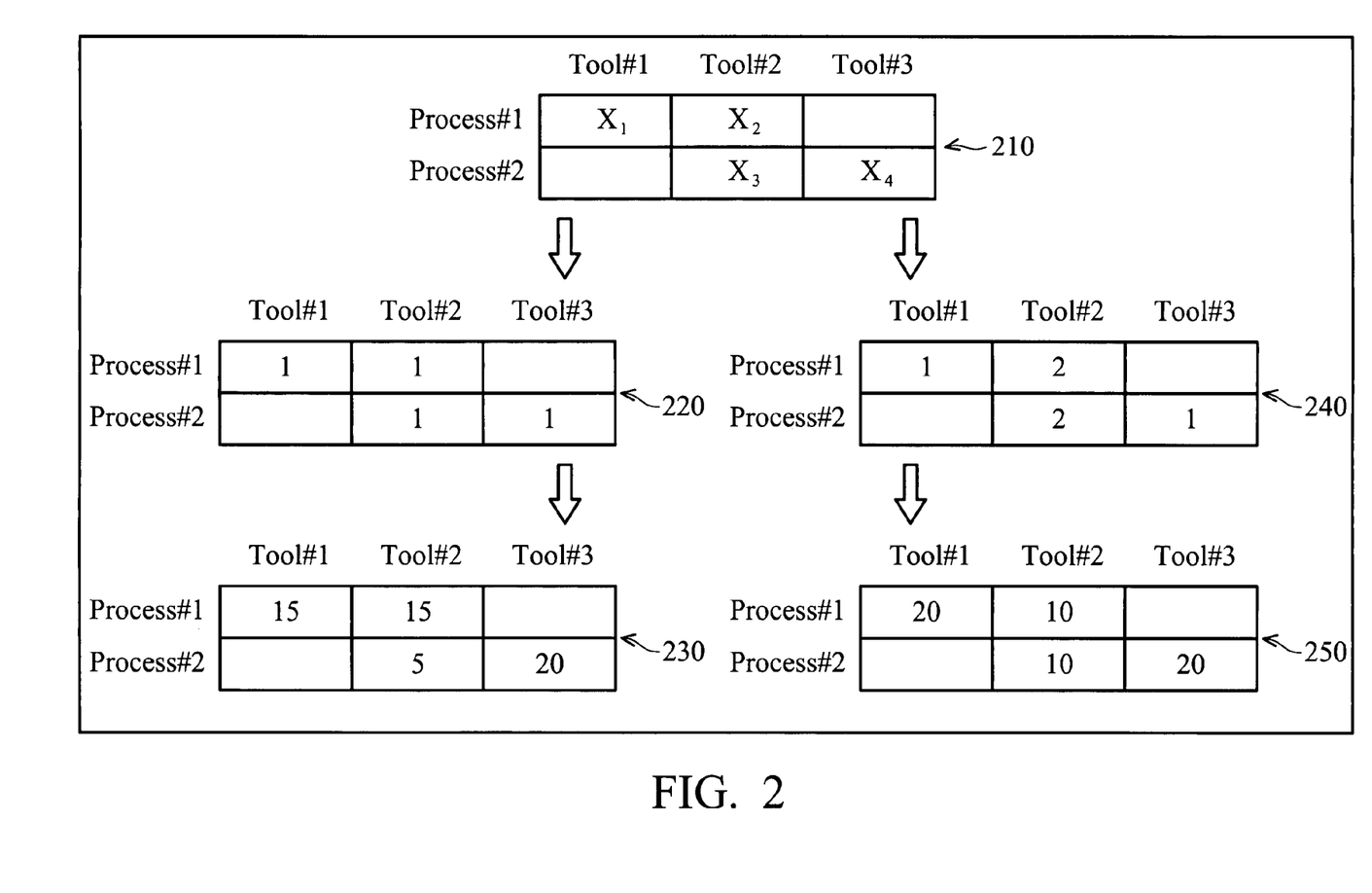
FIG. 2 is a schematic diagram showing the relationship between process moves and tool limited moves with assignment rules and without assignment rules.

As described, processes applied to each tool may not be entirely the same, and when processes must be implemented on a wafer lot and tools executing the processes are assigned using a current assignment method, manufacturing damages may occur and manufacturing efficiency decrease. Several tools of the same production function, for example, are classified to a tool group. Based on product variation, tool variation, production limitation, or product quality, some tools in a tool group only execute processes for specified products. In FIG. 2, for example, wherein tools 1, 2, and 3 are shown. A wafer lot requires 30 moves of a process 1 and process 2 respectively, and tool 1 can only execute process 1, tool 2 can execute processes 1 and 2, and tool 3 can only execute process 2.

The assignment preference method of an embodiment of the present invention determines preferred processed preferences of all available tools when a semiconductor process is implemented on a semiconductor product. According to predetermined assignment rules, when two lots of products wait for assignment, the lot with a higher preference is first processed. As shown in FIG. 2, for example, the process 1 and process 2 require 30 moves respectively based on production planning and demand orders. Additionally, tools 1~3 are restricted to 20 moves respectively every day due to production capacity limitations, such that five equations are generated, in which two equations corresponding to demand moves are $X_1+X_2=30$ and $X_3+X_4=30$ and others corresponding to production capacity limitations are $X_1 \leq 20$, $X_2+X_3 \leq 20$, and $X_4 \leq 20$, where $X_1$, $X_2$, $X_3$, and $X_4$ indicate desired move numbers of tools 1, 2, and 3 respectively, as shown in Table 210 in FIG. 2.

Without an improved assignment method, a tool is not assigned to an assignment preference with regard to desired processes, such that assignment preferences of each tool are assigned to 1, as shown in Table 220 in FIG. 2. Based on the described equations and the set assignment preferences, since assignment preferences of both tools 1 and 2 are 1 and $X_1+X_2=30$, the variables $X_1$ and $X_2$ are calculated and thus equal to 15 respectively, indicating tool 1 can produce 15 moves of process 1 and tool 2 can produce 15 moves of process 1. Next, the variable $X_3$ is calculated according to the equation $X_2+X_3 \leq 20$ and thus equal to 5, indicating the tool 2 can produce 5 moves of the process 2. The variable $X_4$ is calculated according to the equations $X_3+X_4=30$ and $X_4 \leq 20$ and thus equal to 20, indicating the tool 3 can produce 20 moves of the process 2, as shown in Table 230 in FIG. 2.

With an improved assignment method, each tool is assigned to a correct assignment preference according to related production conditions (tool loading, for example), and assignment results are thus obtained as shown in Table 240 in FIG. 2. Thus, when the process 1 is implemented, the assignment preference corresponding to process 1 of tool 1 is assigned to 1 and the assignment preference corresponding to process 1 of tool 2 is assigned to 2. Next, when process 2 is implemented, the assignment preference corresponding to process 2 of tool 3 is assigned to 1 and the assignment preference corresponding to process 2 of tool 2 is assigned to 2. Based on the described equations and assignment preferences, calculation results are shown in Table 250 in FIG. 2. Thus, tool 1 can produce 20 moves of process 1, tool 2 can produce 10 moves of process 1 and 10 moves of process 2, and tool 3 can produce 20 moves of process 2. As shown in Table 230 and Table 250, movement of a tool may be different according to assignment preferences corresponding to the tool and desired processes. As shown in Table 230, the process 2 does not achieve the demand move (30 moves) according to the equation $X_2+X_3 \leq 20$, losing 5 moves. For assignment to bottleneck tools, delivery delay may occur even if only 5 moves are lost.

The method of an embodiment of the invention achieves optimum moves using statistical methods for defining assignment preferences of each tool under limitations of production demands, achieving optimum production moves.

Embodiments of the invention utilize three statistical methods, comprising a tool loading method, a move linear programming method, and a two-step data feedback method, and the described MCP planning tool to model assignment operations of bottleneck tools. The method of an embodiment of the invention uses the MCP planning tool, but is not intended to limit the invention thereto.

The method of embodiments of the invention determines assignment preferences using the described three statistical methods and simulates assignment operations of bottleneck tools accordingly. Demand moves corresponding to each process are first calculated and assignment preferences of each tool are determined using different statistical methods, details of which are further described in the following, in which a tool has a higher priority if a preference value thereof is smaller.

Figure 3:
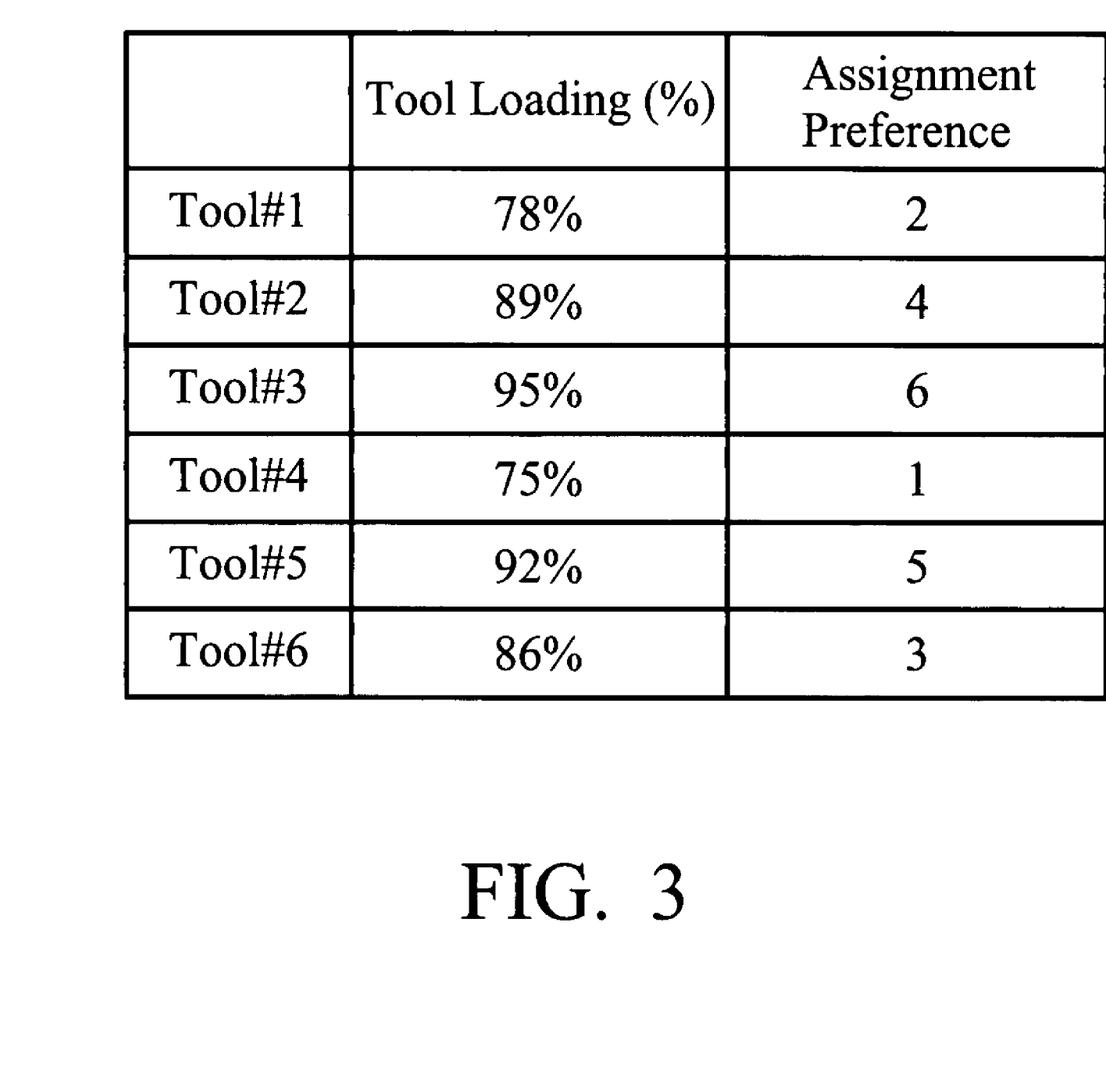
FIG. 3 is a schematic diagram of an embodiment of determining tool assignment preference using a tool loading method.

A process for determining assignment preferences using the tool loading method is first described. The tool loading method determines assignment preferences of each tool according to tool loads in a final manufacturing cycle time. Thus, an assignment preference of a tool comprising the minimum load is assigned to 1, an assignment preference of a tool comprising the next lowest load is assigned to 2, and so forth. As shown in FIG. 3, an average load of tool 4 is 75%, the minimum load among all the tools, such that the assignment preference thereof is assigned to 1. Next, an average load of tool 1 is 78%, a little higher than that of tool 1 instead of others, such that the assignment preference thereof is assigned to 2. The remnant assignment preferences of the tools 2, 3, 5, and 6 are thus determined using the described method. Next, when a process is implemented, a tool (tool 4 in the embodiment) with the minimum assignment preference is first determined to execute the process, and, when the limited moves of the tool 4 are completely output, a tool (tool 1 in the embodiment) with the next smallest assignment preference is then determined to execute the process until the demand move is achieved.

Figure 4A:
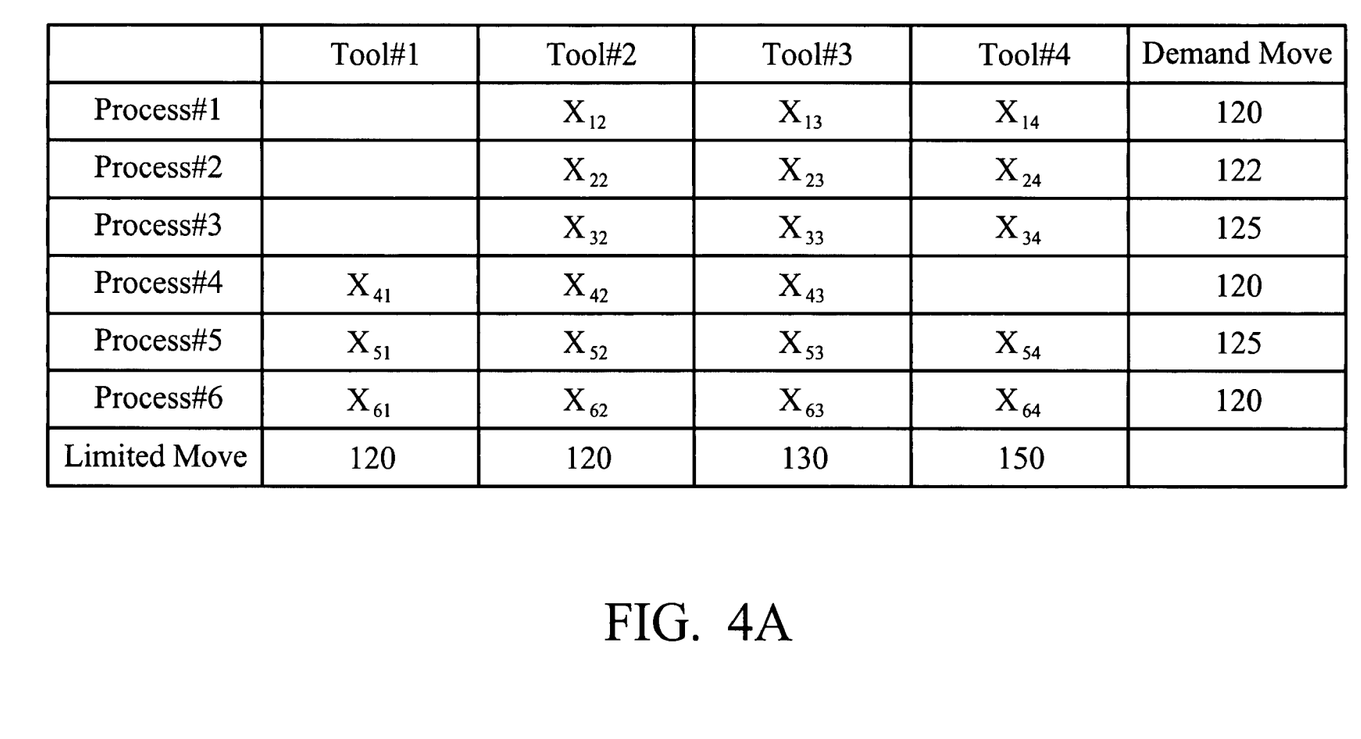
FIGS. 4A and 4B are schematic diagram of an embodiment of determining tool assignment preference using a move linear programming method.
Figure 4B:
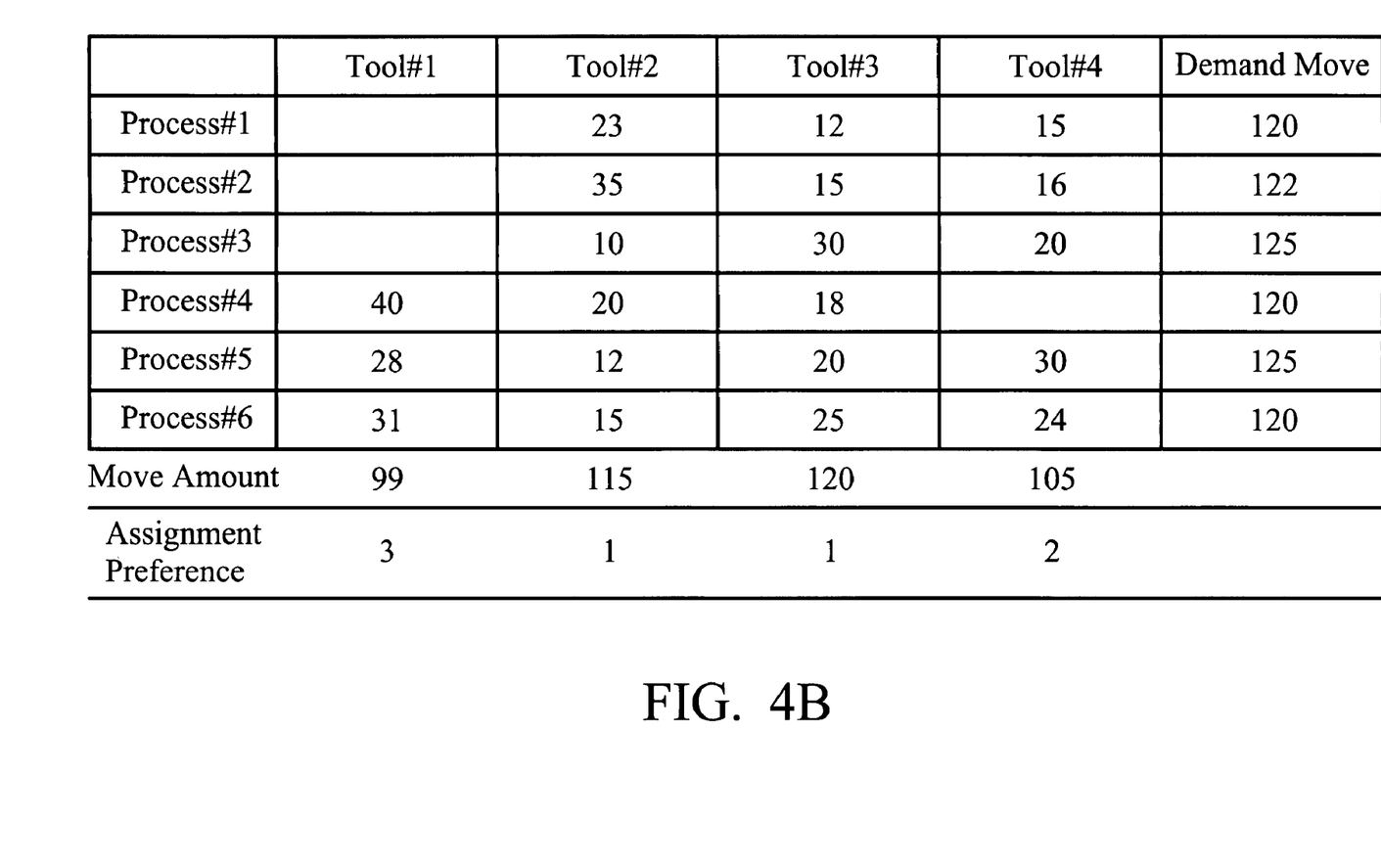

Next, a process for determining assignment preferences using the linear programming method is described. Referring to FIGS. 4A and 4B, the two tables therein show demand move amounts of the processes 1~6 and limited move amounts of the tools 1~4, in which variables $X_{1n}$~$X_{6n}$ indicate applicable move numbers corresponding to the processes of each tool. Next, required equations are described in the following using the linear programming method:

$X_{12}+X_{13}+X_{14}=120$;

$X_{22}+X_{23}+X_{24}=122$;

$X_{32}+X_{33}+X_{34}=125$;

$X_{41}+X_{42}+X_{43}=120$;

$X_{51}+X_{52}+X_{53}+X_{54}=125$;

$X_{61}+X_{62}+X_{63}+X_{64}=120$;

$X_{41}+X_{51}+X_{61}=120$;

$X_{12}+X_{22}+X_{32}+X_{42}+X_{52}+X_{62} \leq 120$;

$X_{13}+X_{23}+X_{33}+X_{43}+X_{53}+X_{63} \leq 130$; and $X_{14}+X_{24}+X_{34}+X_{54}+X_{64} \leq 150$.

The demand move amounts and limited move amounts are examples in the embodiment and are not intended to limit the present invention. Move numbers and amounts corresponding to the processes 1~6 of each tool are obtained according to the described equations, as shown in FIG. 4B. Next, move amounts are compared. According to comparison results, an assignment preference of a tool comprising a maximum move amount within a predetermined limit is assigned to 1, an assignment preference of a tool comprising a next smallest move amount within a predetermined limit is assigned to 2, and an assignment preference of a tool comprising a minimum move amount within a predetermined limit is assigned to 3. Assignment preferences of an embodiment of the invention are defined by three levels, and move ranges of each level are defined as 111~120, 101~110, and 91~100. The move ranges defined in the embodiment are not intended to limit the present invention, and, in practice, the ranges can change for requirements.

Figure 5:
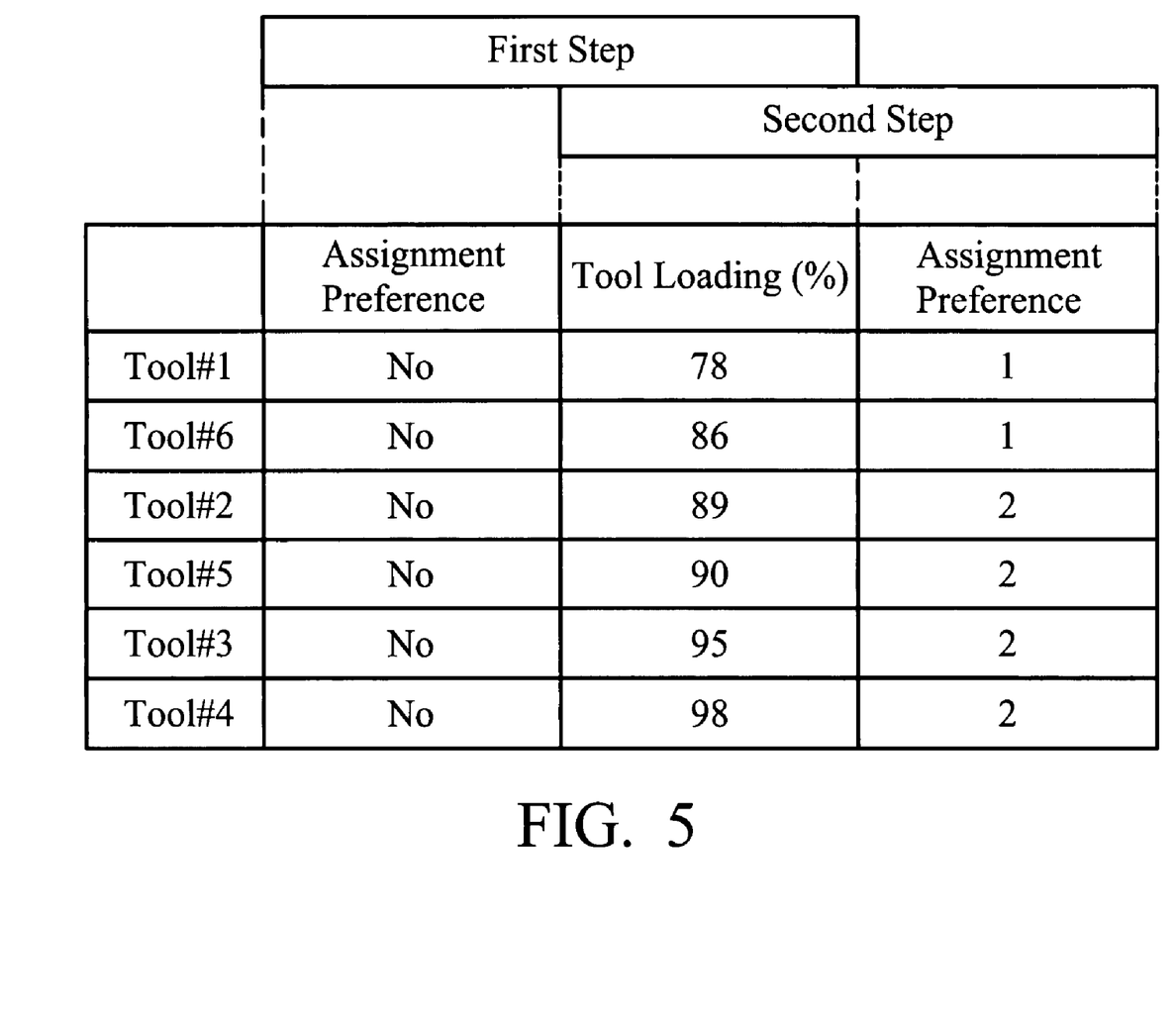
FIG. 5 is a schematic diagram of an embodiment of determining tool assignment preference using a two-step data feedback method.

Next, a process for determining assignment preferences using the two-step data feedback method is described. In an embodiment of the invention, assignment preferences are defined by two levels, assigning assignment preferences of the first 20% tools with the lowest average utility rates to the first assignment preferences and assigning assignment preferences of the remnant 80% tools to the second assignment preferences, as shown in FIG. 5.

Next, an optimum assignment rule is determined according to the described three statistical methods. The simulation process executes the MCP every day according to different assignment rules, thereby obtaining assignment data within a predetermined cycle time (a season, for example). Next, the third assignment rule (according to the two-step data feedback method) is optimum by comparing on time delivery (not shown), bottleneck utilization (not shown), monthly product output (not shown), and monthly product move (not shown) indexes.

By empirical rules, the three assignment rules have opportunities to be implemented. Optimum results may be acquired depending on reality instead of concentrating on the two-step data feedback method.

Figure 6:
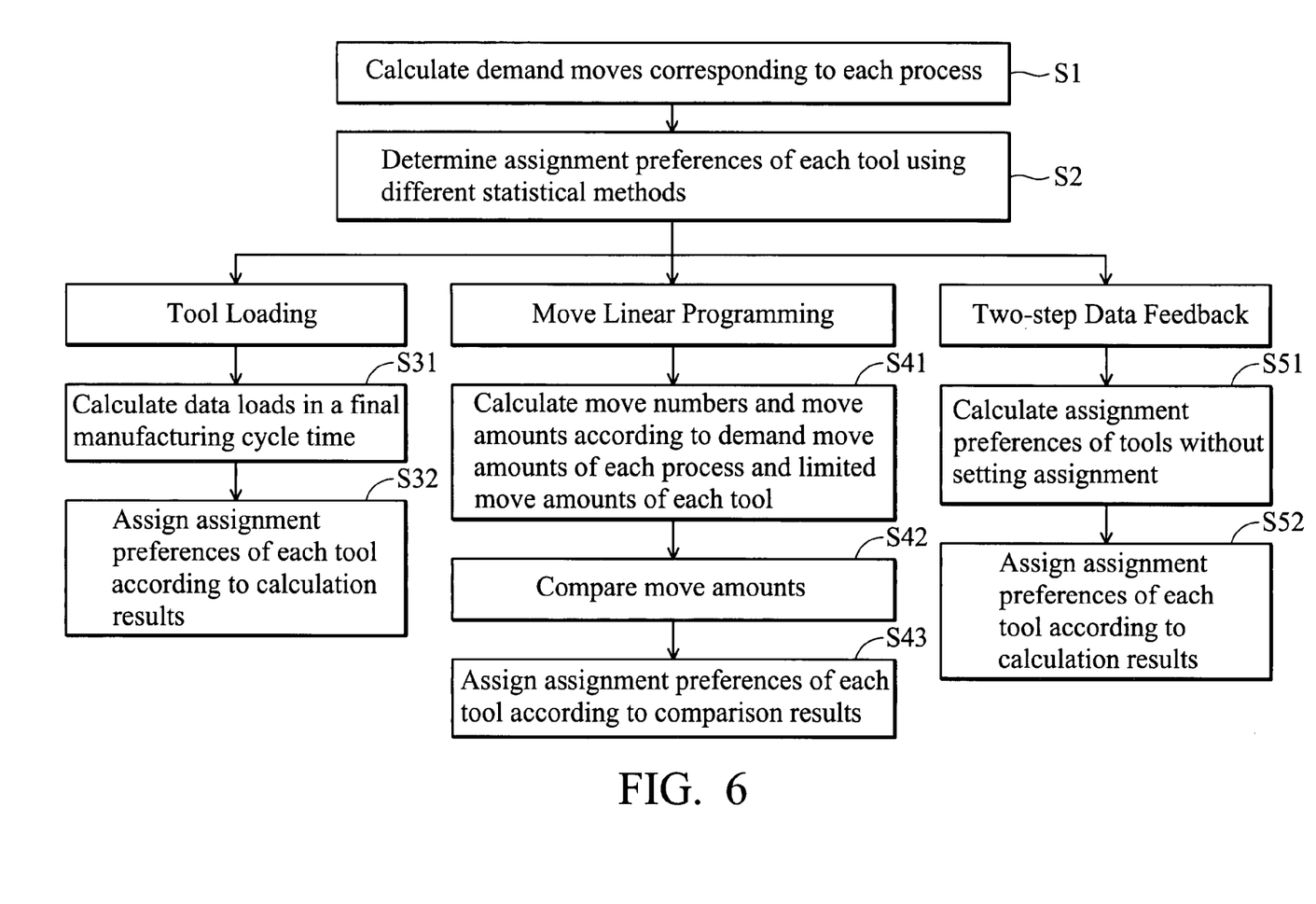
FIG. 6 is a flowchart of an embodiment of the method for determining tool assignment preference.

FIG. 6 is a flowchart of an embodiment of the method for determining tool assignment preference.

Demand moves corresponding to each process are first calculated (step S1) and assignment preferences of each tool are determined using different statistical methods (step S2), comprising a tool loading method, a move linear programming method, and a two-step data feedback method.

With respect to the tool loading method, data loads are calculated in a final manufacturing cycle time (step S31), and assignment preferences of each tool are assigned according to calculation results (step S32), in which an assignment preference of a tool comprising the minimum load is assigned to 1, an assignment preference of a tool comprising a next less load is assigned to 2, and so forth.

With respect to the move linear programming method, move numbers and move amounts are calculated according to demand move amounts of each process and limited move amounts of each tool (step S41). The move amounts are compared (step S42) and assignment preferences of each tool are assigned according to comparison results (step S43). Assignment preference of a tool comprising a maximum move amount within a predetermined limit is assigned to 1, an assignment preference of a tool comprising a next smallest move amount within a predetermined limit is assigned to 2, and an assignment preference of a tool comprising a minimum move amount within a predetermined limit is assigned to 3.

With respect to the two-step data feedback method, in the first step, assignment preferences of tools without setting assignment preferences are calculated (step S51), and, in the second step, assignment preferences of each tool are assigned according to the calculation results (step S52). Assignment preferences of the first 20% tools with the lowest average utility rates are assigned to the first assignment preferences, and assignment preferences of the remnant 80% tools are assigned to the second assignment preferences.

The method for determining tool assignment preferences of an embodiment of the invention can more accurately simulate production moves corresponding to real assignment operations for production optimization.

Although the present invention has been described in preferred embodiment, it is not intended to limit the invention thereto. Those skilled in this technology can still make various alterations and modifications without departing from the scope and spirit of this invention. Therefore, the scope of the present invention shall be defined and protected by the following claims and their equivalents.

What is claimed is:

1. A method for determining tool assignment preference, applied to a semiconductor manufacturing system, comprising:

in the semiconductor manufacturing system, providing at least one first tool and second tool and at least one first semiconductor process and second semiconductor process applied to the tools;

calculating demand moves provided by the first and second semiconductor processes; and determining assignment preferences of the first and second tools using a statistical method;

wherein the statistical method is a two-step data feedback method, comprising the steps of:

in the first step, calculating assignment preferences of tools without setting assignment preferences; and in the second step, assigning assignment preferences of the first and second tools according to the calculation result in the first step, wherein the first tool is assigned to a first assignment preference with a lowest average utility rate, and the second tool is assigned to a second assignment preference.

2. The method for determining tool assignment preference as claimed in claim 1, wherein if a plurality of tools are provided in the semiconductor manufacturing system, assignment preferences of the first 20% tools with the lowest average utility rates are assigned to the first assignment preferences.

3. The method for determining tool assignment preference as claimed in claim 2, wherein assignment preferences of the remnant 80% tools are assigned to the second assignment preferences.

4. The method for determining tool assignment preference as claimed in claim 1, wherein the statistical method is a move linear programming method, comprising the steps of:

calculating required moves applied to the first and second tools corresponding to the first and second semiconductor processes;

totalizing the moves of the first and second tools respectively, thereby obtaining a first move amount and a second move amount;

comparing the first and second move amount; and setting assignment preferences of the first and second tools according to the comparison result, wherein when the first move amount is larger than the second move amount and within a predetermined limit, the assignment preference of the first tool is assigned to the first assignment preference, and, when the second move amount is within a predetermined limit, the assignment preference of the second tool is assigned to the second assignment preference.

5. The method for determining tool assignment preference as claimed in claim 1, wherein the statistical method is a tool loading method, comprising the steps of:

calculating load proportions of the first and second tools within a last process cycle; and setting assignment preferences of the first and second tools according to the calculation result, wherein when the first tool has a lowest load proportion, the assignment preference thereof is assigned to the first assignment preference, and the assignment preference of the second tool is assigned to the second assignment preference.

6. A manufacturing system, executing a manufacturing process using a method for determining and comprising a plurality of tools and a plurality of manufacturing processes applied to the tools, the method comprising:

in the semiconductor manufacturing system, providing at least one first tool and second tool and at least one first semiconductor process and second semiconductor process applied to the tools;

calculating demand moves provided by the first and second semiconductor processes; and determining assignment preferences of the first and second tools using a statistical method;

wherein the statistical method is a two-step data feedback method, comprising the steps of:

in the first step, calculating assignment preferences of tools without setting assignment preferences; and in the second step, assigning assignment preferences of the first and second tools according to the calculation result in the first step, wherein the first tool is assigned to a first assignment preference with a lowest average utility rate, and the second tool is assigned to a second assignment preference.

7. The manufacturing system as claimed in claim 6, wherein if a plurality of tools are provided in the semiconductor manufacturing system, assignment preferences of the first 20% tools with the lowest average utility rates are assigned to the first assignment preferences.

8. The manufacturing system as claimed in claim 7, wherein assignment preferences of the remnant 80% tools are assigned to the second assignment preferences.

9. The manufacturing system as claimed in claim 6, wherein the statistical method is a move linear programming method, comprising the steps of:

calculating required moves applied to the first and second tools corresponding to the first and second semiconductor processes;

totalizing the moves of the first and second tools respectively, thereby obtaining a first move amount and a second move amount;

comparing the first and second move amounts; and setting assignment preferences of the first and second tools according to the comparison result, wherein when the first move amount is larger than the second move amount and within a predetermined limit, the assignment preference of the first tool is assigned to the first assignment preference, and, when the second move amount is within a predetermined limit, the assignment preference of the second tool is assigned to the second assignment preference.

10. The manufacturing system as claimed in claim 6, wherein the statistical method is a tool loading method, comprising the steps of:

calculating load proportions of the first and second tools within a last process cycle; and setting assignment preferences of the first and second tools according to the calculation result, wherein when the first tool has a lowest load proportion, the assignment preference thereof is assigned to the first assignment preference, and the assignment preference of the second tool is assigned to the second assignment preference.

11. A storage medium for storing a computer program providing a method for determining tool assignment preference, comprising using a computer to perform the steps of:

at least one first tool and second tool and at least one first semiconductor process and second semiconductor process applied to the tools;

calculating demand moves provided by the first and second semiconductor processes; and determining assignment preferences of the first and second tools using a statistical method;

wherein the statistical method is a two-step data feedback method, comprising the steps of:

in the first step, calculating assignment preferences of tools without setting assignment preferences; and in the second step, assigning assignment preferences of the first and second tools according to the calculation result in the first step, wherein the first tool is assigned to a first assignment preference with a lowest average utility rate, and the second tool is assigned to a second assignment preference.

12. The storage medium as claimed in claim 11, wherein if a plurality of tools are provided in the semiconductor manufacturing system, assignment preferences of the first 20% tools with the lowest average utility rates are assigned to the first assignment preferences.

13. The storage medium as claimed in claim 12, wherein assignment preferences of the remnant 80% tools are assigned to the second assignment preferences.

14. The storage medium as claimed in claim 11, wherein the statistical method is a move linear programming method, comprising the steps of:

calculating required moves applied to the first and second tools corresponding to the first and second semiconductor processes;

totalizing the moves of the first and second tools respectively, thereby obtaining a first move amount and a second move amount;

comparing the first and second move amount; and setting assignment preferences of the first and second tools according to the comparison result, wherein when the first move amount is larger than the second move amount and within a predetermined limit, the assignment preference of the first tool is assigned to the first assignment preference, and, when the second move amount is within a predetermined limit, the assignment preference of the second tool is assigned to the second assignment preference.

15. The storage medium as claimed in claim 11, wherein the statistical method is a tool loading method, comprising the steps of:

calculating load proportions of the first and second tools within a last process cycle; and setting assignment preferences of the first and second tools according to the calculation result, wherein when the first tool has a lowest load proportion, the assignment preference thereof is assigned to the first assignment preference, and the assignment preference of the second tool is assigned to the second assignment preference.

* * * * *